US012650583B2

(12) United States Patent
Sinclair et al.

(10) Patent No.: US 12,650,583 B2
(45) Date of Patent: Jun. 9, 2026

(54) REIMAGING LENS ASSEMBLY WITH ANGLED OPTIC

(71) Applicant: Raytheon Company, Waltham, MA (US)

(72) Inventors: Matthew A. Sinclair, Allen, TX (US); Robert B. Chipper, McKinney, TX (US)

(73) Assignee: Raytheon Company, Arlington, VA (US)

( * ) Notice: Subject to any disclaimer, the term of this patent is extended or adjusted under 35 U.S.C. 154(b) by 306 days.

(21) Appl. No.: 18/482,588

(22) Filed: Oct. 6, 2023

(65) Prior Publication Data

US 2025/0116851 A1     Apr. 10, 2025

(51) Int. Cl.
G02B 17/08     (2006.01)
G02B 5/04     (2006.01)

(52) U.S. Cl.
CPC ........... G02B 17/0804 (2013.01); G02B 5/04 (2013.01)

(58) Field of Classification Search
CPC ...... G02B 17/0804; G02B 5/04; G02B 13/06; G02B 17/04; G02B 17/086
USPC .......................................... 359/726
See application file for complete search history.

(56) References Cited

U.S. PATENT DOCUMENTS 7,157,706 B2     1/2007   Gat et al.
7,961,382 B2     6/2011   Cornell et al.
10,677,651 B1     6/2020   Bullard
2005/0259330 A1*   11/2005   Neil ......................... G02B 15/12
                                                           359/676
2016/0209726 A1*   7/2016   Kanai ..................... G03B 13/08
2020/0386993 A1   12/2020   Hua
2022/0311917 A1*   9/2022   Yang .................. G02B 13/0065
2023/0305199 A1*   9/2023   Takata ..................... G02B 5/04

FOREIGN PATENT DOCUMENTS

CN            112327454  A     2/2021

OTHER PUBLICATIONS

Yu et al., "Achromatic and athermal catadioptric long wave infrared freeform prism with a diffractive surface," Infrared Physics Technology, vol. 123, Jun. 2022, 10 pages. (Year: 2022).*

(Continued)

*Primary Examiner* — Stephone B Allen
*Assistant Examiner* — Boutsikaris Leonidas

(57) ABSTRACT

A reimaging lens assembly includes a pentaprismatic optic that includes two reflective surfaces and two refractive surfaces. The reflective surfaces are powered surfaces, and the reflective surfaces may be spherical, aspherical, and/or freeform reflective surfaces. The pentaprismatic optic may receive light from a wide field of view (WFOV), and may change the angle of the output light from that of the input light, for example by 90 degrees. The pentaprismatic optic may be coupled to an image receiver, such as a cooled or uncooled camera. The reimaging lens assembly may include further optical elements between the pentaprismatic optic and the image receiver, such as one or more lenses, filters, and/or cold stops. The lens assembly provides a compact system, with a small number of optical elements, and with desensitized output that reduces image jitter.

20 Claims, 5 Drawing Sheets

(56)                 References Cited

OTHER PUBLICATIONS

International Search Report and Written Opinion of the International Searching Authority dated Oct. 31, 2024 in connection with International Patent Application No. PCT/US2024/039797, 10 pages.

Yu et al., "Achromatic and athermal catadioptric long wave infrared freeform prism with a diffractive surface," Infrared Physics Technology, vol. 123, Jun. 2022, 10 pages.

Kiontke, "Monolithic freeform element," Proc. SPIE 9575, Optical Manufacturing and Testing XI, Sep. 2015, 8 pages.

* cited by examiner

| RECEIVE LIGHT | 402 |

| REFLECT LIGHT | 404 |

| OUTPUT LIGHT | 406 |

FIG. 5

REIMAGING LENS ASSEMBLY WITH ANGLED OPTIC

FIELD

The present invention is reimaging lens assemblies, such as that provide a wide field of view (FOV).

BACKGROUND

Wide field of view (WFOV) imagers can involve many components, taking up considerable space. Changing angle with a flat fold mirror for such an imager may add image jitter, increase window size, or decrease field of view.

SUMMARY

According to an aspect of the disclosure, an angled optical reimaging lens assembly includes: a pentaprismatic optic defining a reimaged entrance pupil nearer to an entrance to the pentaprismatic optic than to an exit of the pentaprismatic optic, such that the optic alters an angle of an image output from the exit of the pentaprismatic optic; wherein the pentaprismatic optic has two refractive surfaces and with two reflective surfaces; and wherein the two reflective surfaces are powered, and are spherical, aspherical or freeform reflective surfaces.

According to an aspect of the disclosure, an angled optical reimaging lens assembly includes: a pentaprismatic optic with a real entrance pupil near an entrance of the pentaprismatic optic, with an image near an exit of the pentaprismatic optic, the optic configured such that the optic alters an angle of the image from that of the entrance pupil of the pentaprismatic optic; wherein the pentaprismatic optic has two refractive surfaces and with two reflective surfaces; and wherein the two reflective surfaces are powered, and are spherical or freeform reflective surfaces.

According to an embodiment of any paragraph(s) of this summary, the two reflective surfaces include at least one freeform reflective surface.

According to an embodiment of any paragraph(s) of this summary, the two reflective surfaces are both freeform reflective surfaces.

According to an embodiment of any paragraph(s) of this summary, the two reflective surfaces include at least one spherical reflective surface.

According to an embodiment of any paragraph(s) of this summary, the two reflective surfaces include at least one aspherical reflective surface.

According to an embodiment of any paragraph(s) of this summary, the two reflective surfaces are both spherical reflective surfaces.

According to an embodiment of any paragraph(s) of this summary, the two reflective surfaces are both aspherical reflective surfaces.

According to an embodiment of any paragraph(s) of this summary, the two refractive surfaces are spherical, aspherical, or freeform refractive surfaces.

According to an embodiment of any paragraph(s) of this summary, the two refractive surfaces include at least one freeform refractive surface.

According to an embodiment of any paragraph(s) of this summary, the two refractive surfaces are both freeform refractive surfaces.

According to an embodiment of any paragraph(s) of this summary, the two refractive surfaces include at least one spherical refractive surface.

According to an embodiment of any paragraph(s) of this summary, the two refractive surfaces are both spherical refractive surfaces.

According to an embodiment of any paragraph(s) of this summary, the two refractive surfaces include at least one aspherical refractive surface.

According to an embodiment of any paragraph(s) of this summary, the two refractive surfaces are both aspherical refractive surfaces.

According to an embodiment of any paragraph(s) of this summary, the assembly further includes a baffle at the entrance to the pentaprismatic optic, to reduce glare at the pupil.

According to an embodiment of any paragraph(s) of this summary, the pentaprismatic optic is an F-theta optic where each pixel maintains the same angular subtense (same instantaneous field of view for every pixel).

According to an embodiment of any paragraph(s) of this summary, at least one of the reflective surfaces is also a diffractive surface.

According to an embodiment of any paragraph(s) of this summary, at least one of the refractive surfaces is also a diffractive surface.

According to an embodiment of any paragraph(s) of this summary, the pentaprismatic optic is configured to rotate the output image with one degree of freedom from the input image.

According to an embodiment of any paragraph(s) of this summary, the angle is 90 degrees.

According to an embodiment of any paragraph(s) of this summary, the angle is between 45 degrees and 135 degrees.

According to an embodiment of any paragraph(s) of this summary, the angle is between 80 degrees and 100 degrees.

According to an embodiment of any paragraph(s) of this summary, the assembly further includes an image receiver for receiving the image output from the exit of the pentaprismatic optic.

According to an embodiment of any paragraph(s) of this summary, the image receiver includes an image detector.

According to an embodiment of any paragraph(s) of this summary, the image receiver includes a camera.

According to an embodiment of any paragraph(s) of this summary, the camera is an LWIR camera.

According to an embodiment of any paragraph(s) of this summary, the camera is an MWIR camera.

According to an embodiment of any paragraph(s) of this summary, the camera is a cooled camera.

According to an embodiment of any paragraph(s) of this summary, the camera is an uncooled camera.

According to an embodiment of any paragraph(s) of this summary, the assembly further includes relay optics between the pentaprismatic optic and the image receiver, the relay optics acting on the output image.

According to an embodiment of any paragraph(s) of this summary, the relay optics includes one or more lenses.

According to an embodiment of any paragraph(s) of this summary, the one or more lenses includes at least three lenses.

According to an embodiment of any paragraph(s) of this summary, the relay optics further includes a cold stop.

According to an embodiment of any paragraph(s) of this summary, the one or more lenses is between the pentaprismatic optic and the cold stop.

According to an embodiment of any paragraph(s) of this summary, the relay optics further includes a filter.

According to an embodiment of any paragraph(s) of this summary, the one or more lenses are between the pentaprismatic optic and the filter.

According to an embodiment of any paragraph(s) of this summary, the assembly further includes a baffle at an intermediate image plane of the pentaprismatic optic, between the pentaprismatic optic and the relay optics, to reduce stray light reaching the intermediate image plane.

According to another aspect, a method of angled reimaging includes: receiving incoming light through a first refractive surface of a pentaprismatic optic; reflecting light coming through the first refractive surface successively by a first reflective surface and a second reflective surface of the pentaprismatic optic, wherein the first reflective surface and the second reflective surface are both powered reflective surface and are both spherical or freeform reflective surfaces; outputting light from the pentaprismatic optic through a second refractive surface of the pentaprismatic optic.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 3 is a schematic diagram of an imaging assembly, according to another embodiment.

FIG. 4 is a schematic diagram of an imaging assembly, according to yet another embodiment.

FIG. 5 is a high-level flow chart of a method of angled reimaging, according to an embodiment.

DETAILED DESCRIPTION

A reimaging lens assembly includes a pentaprismatic optic that includes two reflective surfaces and two refractive surfaces. The reflective surfaces are powered surfaces, and the reflective surfaces may include spherical, aspherical, and/or freeform reflective surfaces. The pentaprismatic optic may receive light from a wide field of view (WFOV), and may change the angle of the output light from that of the input light, for example by 90 degrees. The pentaprismatic optic may be coupled to an image receiver, such as a cooled or uncooled camera. The reimaging lens assembly may include further optical elements between the pentaprismatic optic and the image receiver, such as one or more lenses, filters, and/or cold stops. The lens assembly provides a compact system, with a small number of optical elements, and with desensitized output that reduces image jitter.

Figure 1:
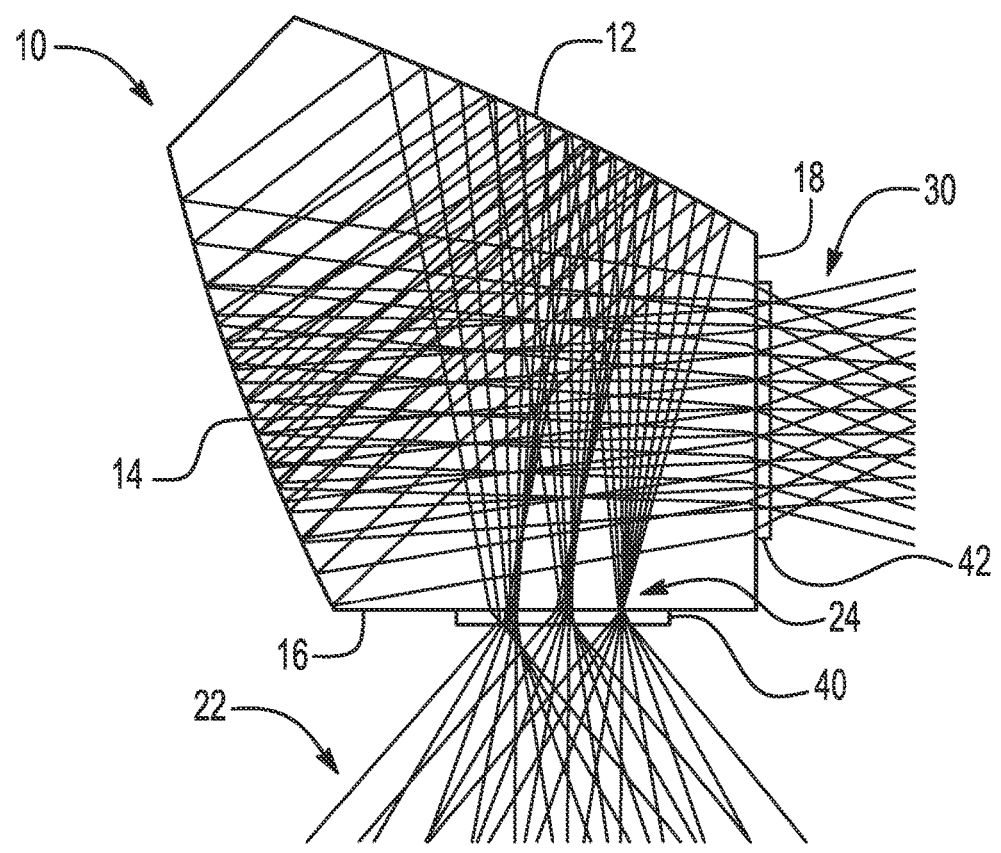
FIG. 1 is a schematic diagram of an optic, according to an embodiment.

FIG. 1 shows a pentaprismatic optic 10, which may be part of a reimaging lens assembly, for redirecting an incoming image to a different direction. The optic 10 has reflective surfaces 12 and 14 that change direction of incident light, and refractive surfaces 16 and 18 that allow incident light to pass therethrough. The reflective surfaces 12 and 14 are powered surfaces, and are freeform, spherical, or aspherical surfaces. The refractive surfaces 16 and 18 may or may not alter images passing through them. In one embodiment, one or both of the refractive surfaces 16 and 18 may be freeform, spherical, or aspherical surfaces. A freeform surface is used herein to refer to a surface that not optically flat, spherical, or aspherical.

Light 22 enters the optic 10 through the first refractive surface 16. The light 22 is focused at a real (non-virtual) pupil 24 which is on an optically upstream (light entry) side of the optic 10. For example the pupil 24 may be at the first refractive surface 16, or in the vicinity of the first refractive surface 16, either within or outside of the optic 10. The passage of the light 22 through the first refractive surface 16 may alter the light passing through, though alternatively the first refractive surface 16 may be configured to allow light to pass through unaltered.

The light 22 then sequentially reflects off of the first reflective surface 12 and the second reflective surface 14. The reflectiospherns off of the reflective surfaces 12 and 14 change the direction of travel of the light 22. The reflective surfaces 12 and 14 are also powered surfaces, meaning that the reflection off of the surfaces 12 and 14 focuses the light 22.

The light 22 then exits the optic 10 through the second refractive surface 18. An output image 30 from the light that exits the optic 10 may then be acted on by other components outside of the optic 10.

The real entrance pupil 24 is near an entrance of the pentaprismatic optic 10, with an image (the output image 30) near an exit of the pentaprismatic optic 10. The term "near," as used in this context, broadly includes within three pupil diameters of the pupil 24. More narrowly, the term "near" includes within one pupil diameter of the pupil 24. Even more narrowly, the term "near" may mean within ⅓ of a pupil diameter of the pupil 24. Most narrowly, "near" may mean at the surface of the pentaprismtic optic 10.

The pentaprismatic optic 10 may be made of suitable materials silicon, germanium, chalcogenides, ZnS, ZnSe, BaF, or CaF. The surfaces 12-18 may be made using diamond point turning (DPT) technology. Other suitable materials are glasses and plastics that can be molded, such as ultem, zeonex, zeonor, PMMA, polycarbonate, polystyrene, polyesters, nylons, or chalcogenides. The listed materials and processes are only examples, and other processes may be employed such as belt polishing or magnetorheological finishing (MRF).

One or both of the reflective surfaces 12 and 14 may include diffractive optical surfaces. One or both of the refractive surfaces 16 and 18 may include diffractive optical surfaces. Diffraction in the surfaces 12-18 may be used to correct lateral and/or aerial color, and/or to make the system athermal (or closer to athermal).

In the illustrated embodiment the optic 10 is depicted as changing the direction of light by 90 degrees. Alternatively the optic 10 may be configured to change the direction of light at a different (non-right) angle, for example at an angle from 45, 60, or 80 degrees, to 100, 120, or 135 degrees. More broadly, the lower bound for non-right-angle angle change may have a lower bound of from 45 to less than 90 degrees, and the upper bound may be from greater than 90 degrees, to 135 degrees.

The optic 10 advantageously has a short focal length, and is able to receive input light from a wide field of view (FOV). For example, some embodiments of the present disclosure are designed to achieve a FOV greater than 120-degrees, e.g., a 130-degree FOV. The powered penta-prismatic optic 10 starts to bend and control the rays immediately at the entrance pupil of the optic due to it having powered surface(s). This allows a wider field of view than a traditional pentaprism. In addition, relay optics may allow for a magnification change from the pentaprismatic optic 10, to adjust the final focal length. The focal length and a given detector size determine the final FOV.

The optic 10 also may advantageously changes the angle of the image without increasing image jitter, as would occur with a flat fold mirror, which would double the angle of a line-of-sight error the direction of tilt. The optic 10 thus desensitizes light of sight errors in the system, unlike for systems with flat folding mirrors. For relay optics without magnification the pentaprismatic optic is an imager by itself, allowing 1 to 1 angular error due to the optic being mono-lithic. If a flat mirror was in front of a normal symmetrical lens, the angle incident on the mirror would be doubled.

A baffle or Lyot stop 40 may be located where light enters the optic 10. The baffle 40 may be used to reduce glare or other stray light at the pupil 24. In one embodiment, the entrance pupil baffle is positioned adjacent to (or at) a front entrance pupil and a baffle 42 is positioned adjacent to an intermediate image plane 32. The baffle 42 may be config-ured to prevent stray light from adversely affecting the image. In other embodiments, some of which are discussed below, the baffle 42 is located between the optic 10 and relay optics (not shown in FIG. 1).

Figure 2:
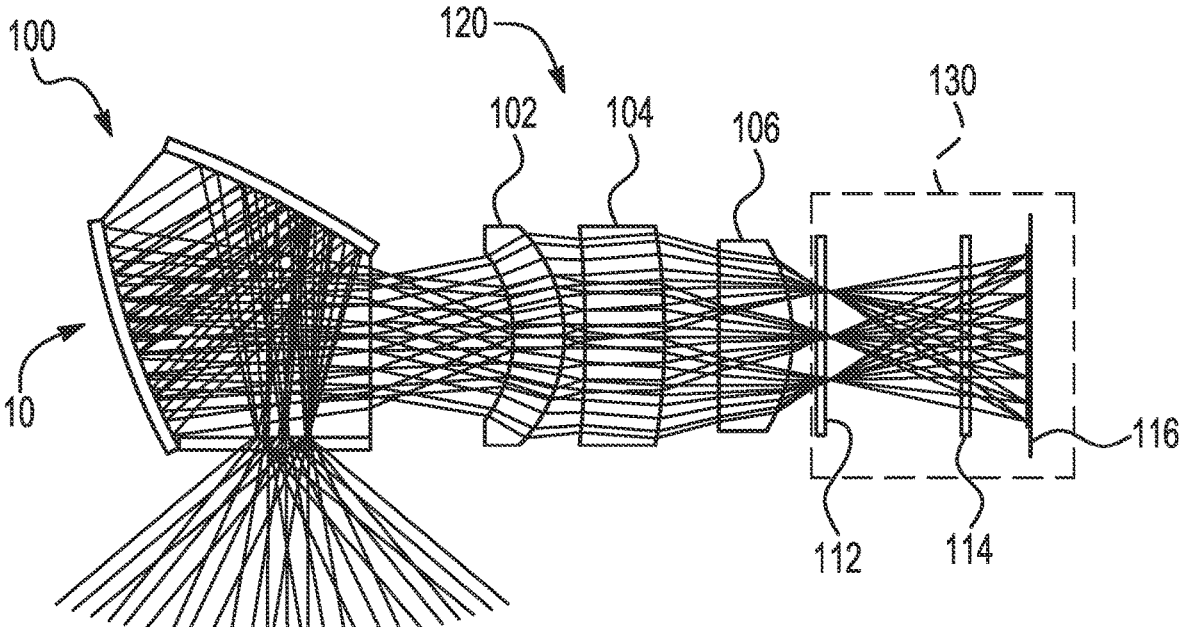
FIG. 2 is a schematic diagram of an imaging assembly, according to an embodiment.

The pentaprismatic optic 10 may be combined with other optical elements as part of a reimaging lens assembly. One example of such a configuration is the reimaging lens assembly 100 shown in FIG. 2, which includes lens 102, 104, and 106, a cold stop 112, a filter 114, and an image detector 116.

The lenses 102, 104, and 106 together constitute an imager lens group 120. As shown, the imager lens group 120 includes multiple lenses having a positive refractive power. In some embodiments, the imager lens group 120 includes three lenses. In some other embodiments, the imager lens group 120 may include fewer or more than three lenses. In one embodiment, the imager lens group 120 includes four lenses, including the first or front objective lens 102 embodying a negative meniscus lens, a second lens 104 embodying a positive meniscus lens, a third lens 106 embodying a positive meniscus lens. In other embodiments, a fourth lens could be added, for instance a weak negative meniscus lens. As known in optics, a positive meniscus lens is a convex-concave lens thicker at its center than at its edges. A positive meniscus lens is used to minimize spheri-cal aberration. When used in combination with other lenses, a positive meniscus lens will shorten the focal length, and increase the numerical aperture (NA) of the lens assembly. A negative meniscus lens is a convex-concave lens that is thinner at its center than at its edges. A negative meniscus lens increases a divergence of a beam without introducing any significant spherical aberration. When used in combi-nation with other lenses, a negative meniscus lens increases the focal length, and decreases the NA of the system.

The lenses of the lens assembly 100 may be made from any of a variety of suitable materials. Examples of suitable lens materials include zinc sulfide (ZnS), infrared chalco-genide glass 26 (IRG26), germanium, and infrared chalco-genide glass 24 (IRG24).

The lens assembly 100 further includes the cold stop 112 positioned behind the lens group 120. A cold stop is a device to protect an object from unwanted heating by thermal radiation or light. Cold stops are used in infrared optical devices for military applications, for example, and are provided to protect infrared sensors from stray infrared radiation.

The lens assembly 100 further includes the detector 116, such as a focal plane array, with the filter 114 disposed between the cold stop 112 and the detector 116. The detector 116 is provided to detect an image from the light that travels through the lens assembly 100. In one embodiment, the detector 116 is an image sensor having an array of light-sensitive pixels at the focal plane of the lens assembly 100. Although focal plane arrays are used for imaging purposes, the focal plane array can also be used for non-imaging purposes, such as spectrometry, light detection and ranging (LIDAR), and wave-front sensing.

In an embodiment, the cold stop 112, the filter 114, and the image detector 116 all may be parts of a cooled camera 130. The camera 130 may be a middle wave infrared (MWIR) camera, for example being configured for detecting IR light in the 3-5 μm wavelength range.

Figures 3, 4, 5:
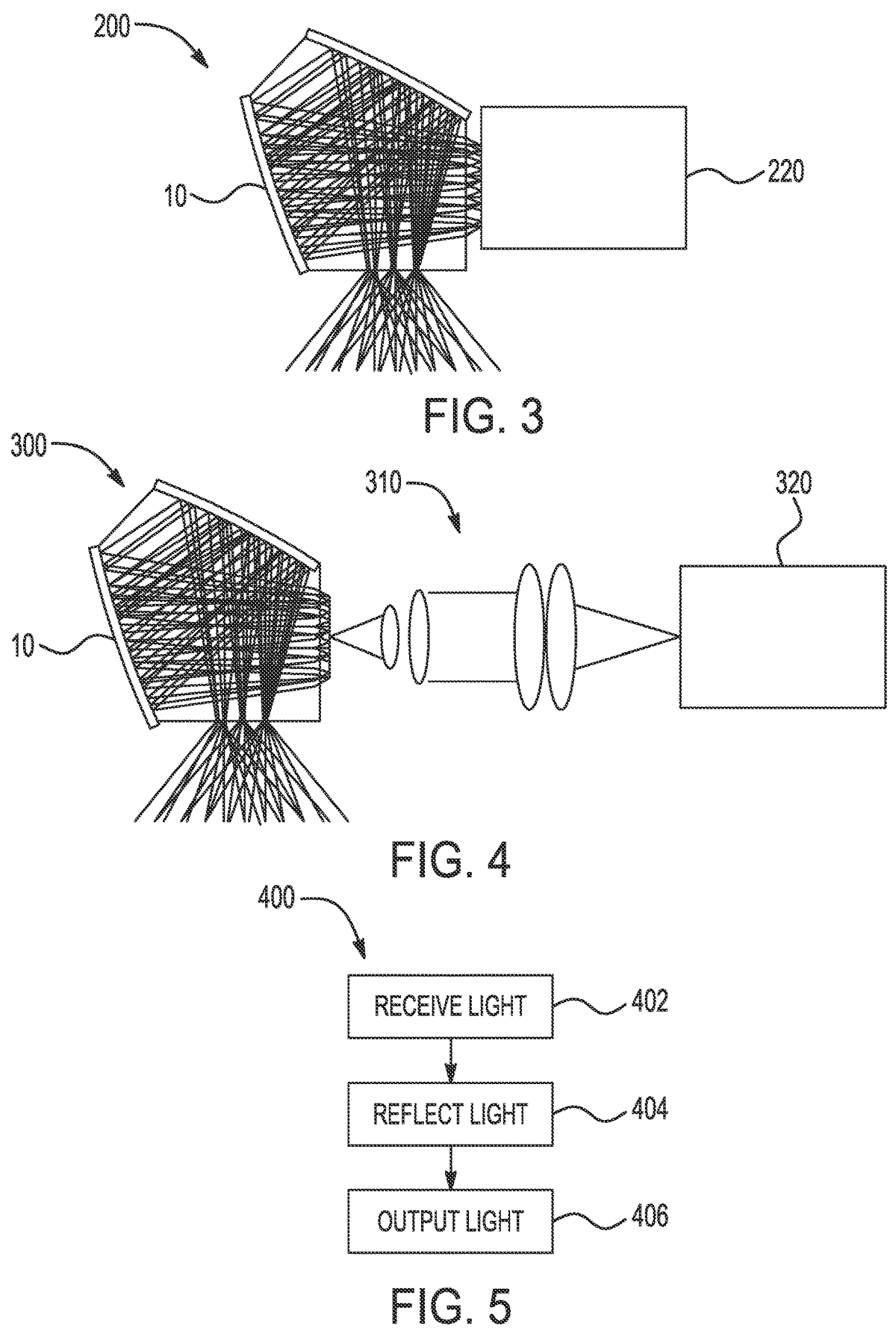

FIG. 3 shows another embodiment, a reimaging lens assembly 200 where output from the pentaprismatic optic 10 is directly sent to a camera 220. The camera 220 may be an uncooled camera, for example a long wave infrared (LWIR) camera, for example being configured for detecting IR light in the 8-12 μm wavelength range.

FIG. 4 shows yet another embodiment, a reimaging lens assembly 300 which has a relay lens array 310 between the pentaprismatic optic 10 and a camera 320. The relay lens array can modify the image, for example modifying the magnification, controlling a reimaged pupil, and/or provid-ing/affecting color dispersion, athermalization, and/or dis-tortion. The camera 320 may be similar to the camera 220 (FIG. 3), an uncooled camera, for example a long wave infrared (LWIR) camera, for example being configured for detecting IR light in the 8-12 μm wavelength range.

FIG. 5 is a high-level flow chart of a method 400 for angled reimaging using the optic 10 (FIG. 1). In step 402 the optic 10 receives incoming light through the first refractive surface 16 (FIG. 1). In step 404 the light reflects succes-sively off the reflective surfaces 12 and 14 (FIG. 1) of the optic 10. And in step 406 light exits the optic 10 through the second refractive surface 18 (FIG. 1).

Figure 6:
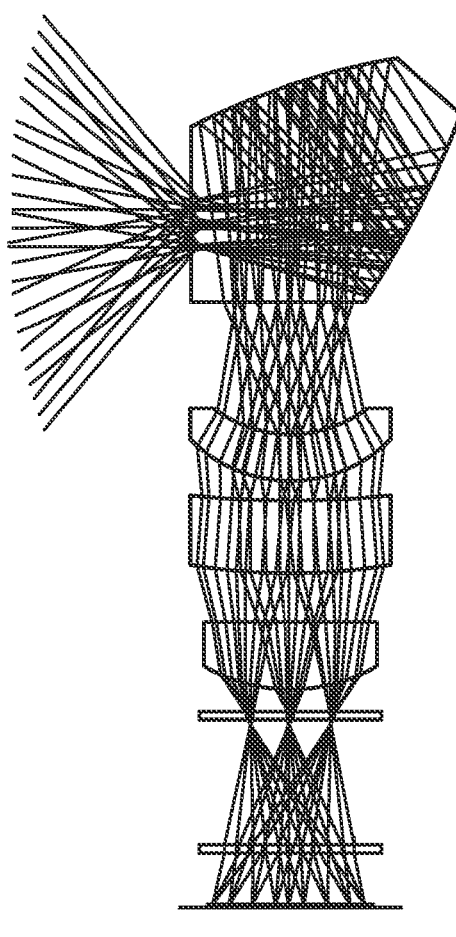
FIG. 6 is a schematic diagram of an imaging assembly, according to a first embodiment.
Figure 7:
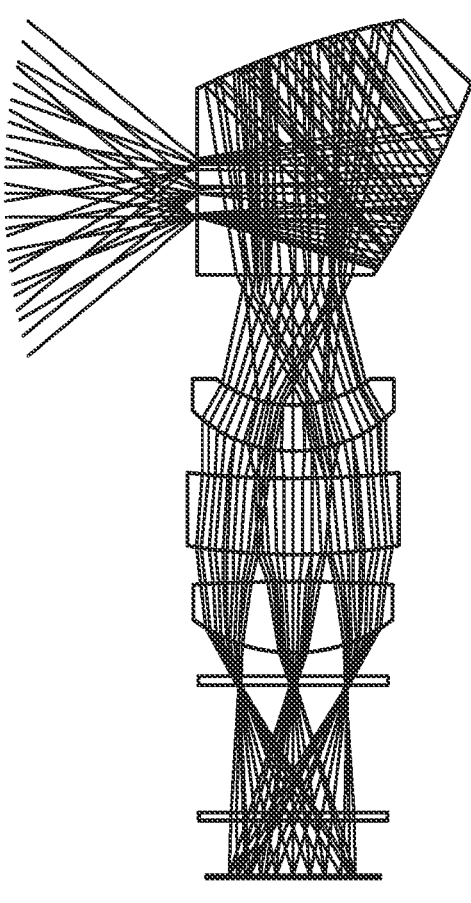
FIG. 7 is a schematic diagram of an imaging assembly, according to a second embodiment.
Figure 8:
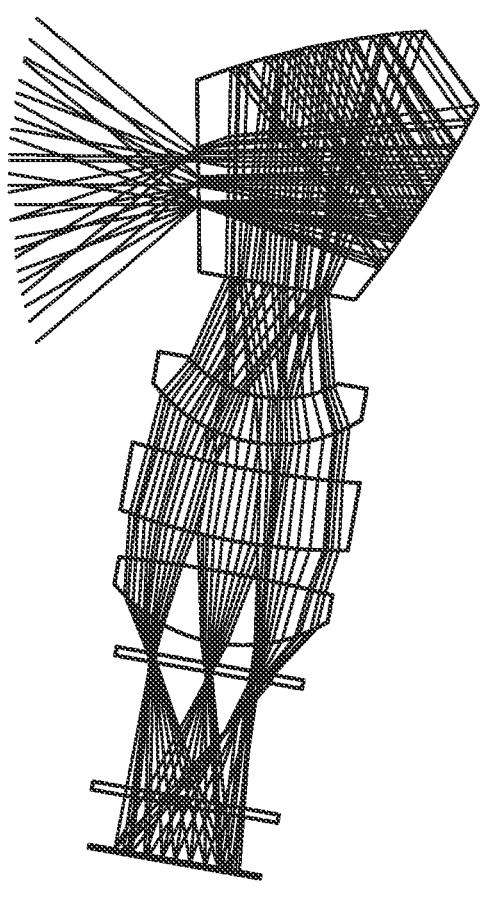
FIG. 8 is a schematic diagram of an imaging assembly, according to a third embodiment.
Figure 9:
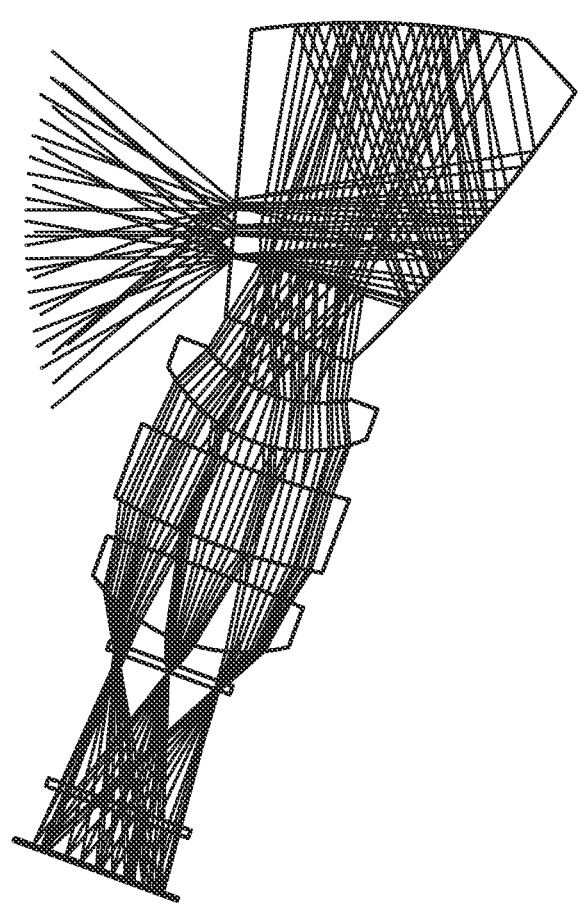
FIG. 9 is a schematic diagram of an imaging assembly, according to a fourth embodiment.
Figures 10, 11:
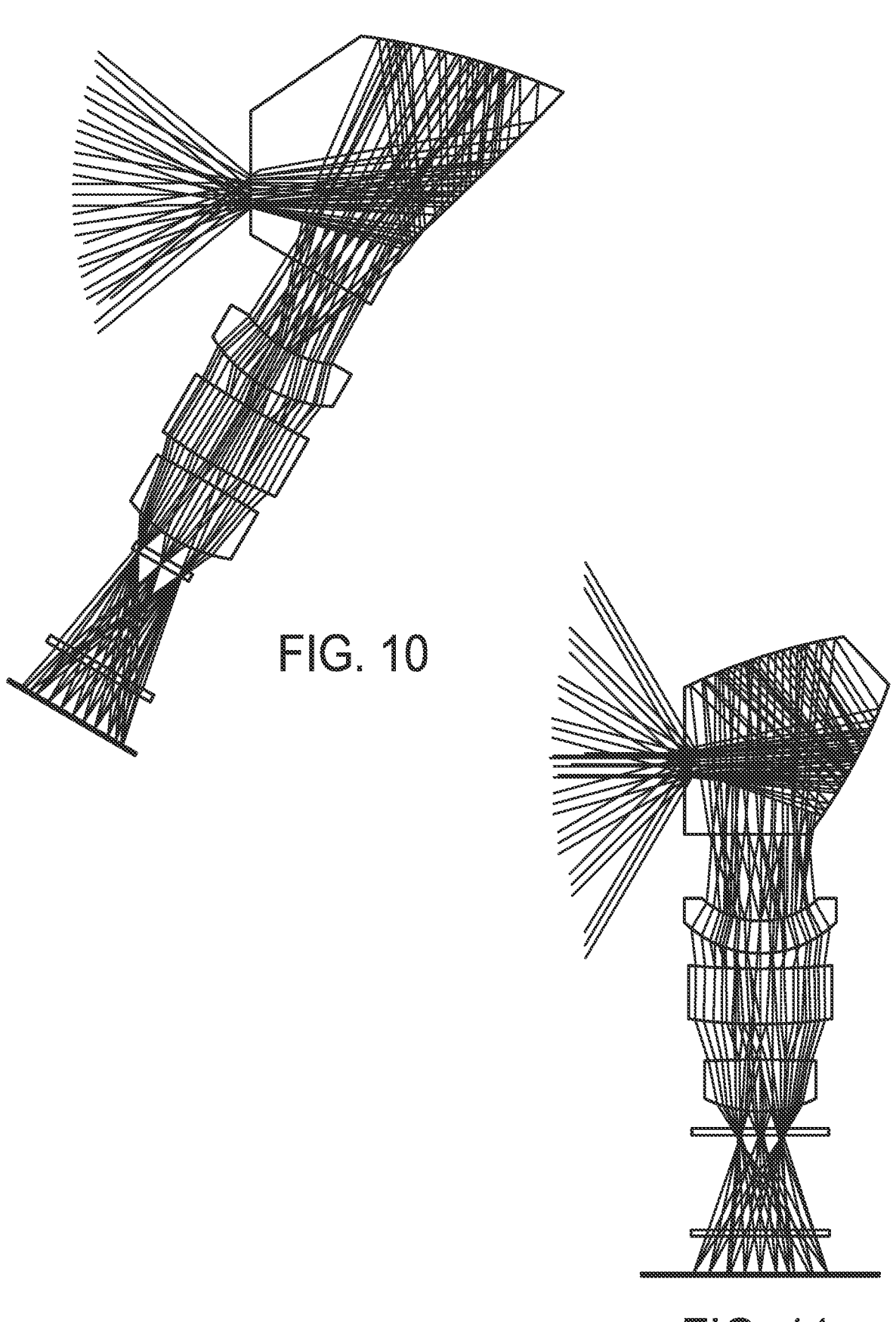
FIG. 10 is a schematic diagram of an imaging assembly, according to a fifth embodiment.
FIG. 11 is a schematic diagram of an imaging assembly, according to a sixth embodiment.

FIGS. 6-11 show alternative arrangements, lens assem-blies in which a pentaprismatic optic has a non-right-angle turning, and for which the systems have varying full fields of view. FIG. 6 illustrates a system of a 100 Degree Full Field of View, and a 90 degree angle between entrance pupil and image plane. FIG. 7 illustrates a system of an 80 Degree Full Field of View, and a 90 degree angle between entrance pupil and image plane. FIG. 8 illustrates a system of an 80 Degree Full Field of View, and a 100 degree angle between entrance pupil and image plane. FIG. 9 illustrates a system of an 80 Degree Full Field of View, and a 110 degree angle between entrance pupil and image plane. FIG. 10 illustrates a system of an 80 Degree Full Field of View, and a 120 degree angle between entrance pupil and image plane. FIG. 11 illustrates a system of a 120 Degree Full Field of View, and a 90 degree angle between entrance pupil and image plane.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An angled optical reimaging lens assembly comprising:
a pentaprismatic optic with a real entrance pupil near an entrance of the pentaprismatic optic and with an image near an exit of the pentaprismatic optic, the pentaprismatic optic configured such that the pentaprismatic optic alters an angle of the image from that of the entrance pupil of the pentaprismatic optic;
wherein the pentaprismatic optic has two freeform refractive surfaces and two reflective surfaces; and
wherein the two reflective surfaces are powered.

2. The assembly of claim 1, wherein the two reflective surfaces include at least one freeform reflective surface.

3. The assembly of claim 1, wherein the two reflective surfaces include at least one spherical reflective surface.

4. The assembly of claim 1, wherein the two reflective surfaces include at least one aspherical reflective surface.

5. The assembly of claim 1, further comprising a baffle at the entrance to the pentaprismatic optic, the baffle configured to reduce glare at the entrance pupil.

6. The assembly of claim 1, wherein the pentaprismatic optic is configured to rotate an output image with one degree of freedom from an input image.

7. The assembly of claim 1, wherein the angle is 90 degrees.

8. The assembly of claim 1, further comprising an image receiver configured to receive an image output from the exit of the pentaprismatic optic.

9. The assembly of claim 8, wherein the image receiver includes an image detector.

10. The assembly of claim 8, wherein the two reflective surfaces are spherical or freeform reflective surfaces.

11. The assembly of claim 8, further comprising relay optics between the pentaprismatic optic and the image receiver, the relay optics configured to act on an output image.

12. The assembly of claim 11, wherein the relay optics include one or more lenses.

13. The assembly of claim 12, wherein the relay optics further include a cold stop.

14. The assembly of claim 13, wherein the one or more lenses are between the pentaprismatic optic and the cold stop.

15. The assembly of claim 12, wherein the relay optics further include a filter.

16. The assembly of claim 15, wherein the one or more lenses are between the pentaprismatic optic and the filter.

17. The assembly of claim 11, further comprising a baffle at the image near the exit of the pentaprismatic optic, the baffle being between the pentaprismatic optic and the relay optics and configured to reduce stray light reaching the image near the exit of the pentaprismatic optic.

18. The assembly of claim 1, wherein the image near the exit of the pentaprismatic optic is within three pupil diameters of a pupil.

19. The assembly of claim 1, wherein the pentaprismatic optic has a field of view greater than 120 degrees.

20. A method of angled reimaging, the method comprising:
receiving incoming light through a first freeform refractive surface of a pentaprismatic optic;
reflecting light coming through the first refractive surface successively by a first reflective surface and a second reflective surface of the pentaprismatic optic, wherein the first reflective surface and the second reflective surface are both powered reflective surfaces; and
outputting light from the pentaprismatic optic through a second freeform refractive surface of the pentaprismatic optic.

* * * * *